US011969861B2

(12) United States Patent
Öhlund et al.

(10) Patent No.: US 11,969,861 B2
(45) Date of Patent: Apr. 30, 2024

(54) TORQUE TRANSFERRING DEVICE FOR USE WITH A POWER TOOL

(71) Applicant: ATLAS COPCO INDUSTRIAL TECHNIQUE AB, Stockholm (SE)

(72) Inventors: Dennis Öhlund, Uppsala (SE); William Fredriksson, Uppsala (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/036,321

(22) PCT Filed: Nov. 17, 2021

(86) PCT No.: PCT/EP2021/082005
§ 371 (c)(1),
(2) Date: May 10, 2023

(87) PCT Pub. No.: WO2022/117347
PCT Pub. Date: Jun. 9, 2022

(65) Prior Publication Data

US 2024/0025022 A1 Jan. 25, 2024

(30) Foreign Application Priority Data

Dec. 1, 2020 (SE) .................................... 2030350-9

(51) Int. Cl.
*B25B 23/00* (2006.01)
*B25B 13/06* (2006.01)
*B25B 21/00* (2006.01)

(52) U.S. Cl.
CPC .......... *B25B 23/0035* (2013.01); *B25B 13/06* (2013.01); *B25B 23/0021* (2013.01); *B25B 21/002* (2013.01)

(58) Field of Classification Search
CPC ............ B25B 23/0035; B25B 23/0021; B25B 23/0007; B25B 21/002; B25B 21/02; B25B 13/06; B25B 13/065
See application file for complete search history.

(56) References Cited

U.S. PATENT DOCUMENTS 5,018,411 A * 5/1991 La Padura .............. B25B 15/02 81/437
5,954,463 A 9/1999 Jore
(Continued)

FOREIGN PATENT DOCUMENTS

CN 107866591 A 4/2018
CN 110268241 A 9/2019
(Continued)

OTHER PUBLICATIONS

Atlas Copco Industrial Technique AB, International Patent Application No. PCT/EP2021/082005, International Search Report, dated Feb. 18, 2022.
(Continued)

*Primary Examiner* — David B. Thomas
(74) *Attorney, Agent, or Firm* — Moore & Van Allen PLLC; W. Kevin Ransom

(57) ABSTRACT

The present specification relates to a torque transferring device for power tools, comprising a first portion comprising a first engaging structure arranged at a front end of the first portion and adapted to engage a corresponding mating structure to transfer torque thereto, and a second portion comprising a second engaging structure for connection to the output shaft of a power tool arranged at a rear end portion of the second portion, wherein the second engaging portion comprises an open cavity adapted to receive the output shaft of a power tool. The device further comprising a pin arranged at least partly in the open cavity, wherein the pin
(Continued)

is arranged to extend in an axial direction and further arranged to, in use, engage a hole formed in the power tool output shaft.

14 Claims, 2 Drawing Sheets

(56) References Cited

U.S. PATENT DOCUMENTS

| | | | | |
|---|---|---|---|---|
| 7,434,494 | B1 | 10/2008 | Snider | |
| 10,442,062 | B1 | 10/2019 | Hack | |
| 10,549,357 | B2 | 2/2020 | Grolimund et al. | |
| 10,800,015 | B2 * | 10/2020 | Zhang | B25B 23/0035 |
| 10,906,161 | B2 * | 2/2021 | Xu | B25B 23/0035 |
| 11,027,400 | B2 * | 6/2021 | Raskin | B25G 1/125 |
| 11,162,853 | B2 | 11/2021 | Caffa et al. | |
| 11,311,988 | B2 * | 4/2022 | Kuo | B25B 23/0007 |
| 2005/0135890 | A1 | 6/2005 | Bauman | |
| 2018/0104797 | A1 | 4/2018 | Todd et al. | |
| 2020/0055168 | A1 * | 2/2020 | Kuo | B25B 23/141 |
| 2021/0205962 | A1 * | 7/2021 | Mesnil | B25B 13/065 |
| 2021/0260735 | A1 * | 8/2021 | Raskin | B25B 23/0035 |
| 2021/0308842 | A1 * | 10/2021 | Abbott | B23B 31/1071 |
| 2023/0048818 | A1 * | 2/2023 | Rönblom | B25B 21/02 |

FOREIGN PATENT DOCUMENTS

| | | | |
|---|---|---|---|
| DE | 102018118335 | A1 | 1/2020 |
| EP | 1938927 | A2 | 7/2008 |
| JP | 2013146818 | A | 8/2013 |
| WO | 2016177394 | A1 | 11/2016 |
| WO | 2016198115 | A1 | 12/2016 |
| WO | 2018204468 | A1 | 11/2018 |

OTHER PUBLICATIONS

Atlas Copco Industrial Technique AB, International Patent Application No. PCT/EP2021/082005, Written Opinion, dated Feb. 18, 2022.

Atlas Copco Industrial Technique AB, International Patent Application No. PCT/EP2021/082005, International Preliminary Report on Patentability, dated Nov. 15, 2022.

Atlas Copco Industrial Technique AB, Swedish Patent Application No. 2030350-9, Office Action, dated Jun. 18, 2021.

Atlas COPCO Industrial Technique AB, Chinese Patent Application No. 202180080796.4, First Office Action, Nov. 17, 2023.

* cited by examiner

TORQUE TRANSFERRING DEVICE FOR USE WITH A POWER TOOL

CROSS-REFERENCE TO RELATION APPLICATIONS

This application is a National Stage patent application (filed under 35 § U.S.C. 371) of PCT/EP2021/082005, filed Nov. 17, 2021, of the same title, which, in turn claims priority to Swedish Patent Application No. 2030350-9 filed Dec. 1, 2020, of the same title; the contents of each of which are hereby incorporated by reference.

FIELD OF THE INVENTION

The present invention generally relates to a torque transferring device for connection to the output shaft of a power tool such as for example a socket, an extension or a quick change adapter.

BACKGROUND OF THE INVENTION

Torque transferring devices for connection to the output shaft of a power tool, such as sockets for tightening of nuts or screws, extensions or adapters, such as quick-change adapters, are well known. For example, a well-known standard type of socket has a square cross sectional recess at its rear end intended for receiving the square shaped end portion of a power tool output shaft and an internal cross sectional shape adapted to fit the type of screw joint to be tightened, for instance a hexagonal shape, at its front end. Similarly, an adapter or extension may comprise the same type of structure for receiving the square shaped end portion of a power tool output shaft but, at its front end, a structure for engaging the rear end of a socket or similar.

Common to all these devices is a more or less elongated design which is adapted to be attached to the tool output at its base only. These inherit characteristics of these types of devices commonly cause problems relating to the ensuring of a proper rotation of the device about its center, i.e. to avoiding any undesired wobbling of the device during rotation. Such wobbling may further in turn cause problems relating to positioning of the socket as well—this may be of particular significance in applications involving automated tightening operations by means of for example a robot or similar handling the tool and socket.

In order to alleviate some of these problems, attempts have been made to use for parts of the tool such as the base of the tool output to provide additional guiding to the socket or extension. For example, a larger diameter adapted to fit a corresponding diameter arranged before the square on the tool may be provided before the square on the socket. Apart from not always providing sufficient guiding, this also has the disadvantage of adding height and is hence not always a feasible solution.

Although some improvement may be achieved using the solutions described above, there are hence still problems remaining, especially when using longer devices, and there exists a need for improvement in the field of torque transferring devices for power tools such as sockets and extensions.

SUMMARY OF THE INVENTION

Accordingly, it would be desirable to provide a torque transferring device for a power tool adapted to provide an improved attachment to the tool output shaft and improved positioning. In particular, it would be desirable to provide such a device having a compact design. To better address one or more of these concerns a torque transferring device as defined in the independent claim is provided. Preferred embodiments are defined in the dependent claims.

According to a first aspect of the present invention a torque transferring device for power tools is provided, the device comprising a first portion comprising a first engaging structure arranged at a front end of the first portion and adapted to engage a corresponding mating structure to transfer torque thereto, and a second portion comprising a second engaging structure for connection to the output shaft of a power tool arranged at a rear end portion of the second portion, wherein the second engaging portion comprises an open cavity adapted to receive the output shaft of a power tool, the device further comprising a pin arranged at least partly in the open cavity, wherein the pin is arranged to extend in an axial direction and further arranged to, in use, engage a hole formed in the power tool output shaft.

According to the first aspect, the torque transferring device provides an inventive solution to the concerns described above by means of a design providing an integrated guide functionality—i.e. the pin adapted to engage the output shaft which hence ensures proper rotation of the device about its center. Further, since the pin utilizes or extends into a hole provided in the tool output shaft, the guiding provided is not only more efficient but provided in a particularly compact manner. Hence, the torque transferring device according to independent claim 1 cleverly solves the problem of achieving an improved guiding and hence less wobbling in a compact manner not increasing the size of the device and will further reduce the circular run-out on the device and make the positioning of the socket easier.

The device, which in some embodiments may be for example a socket, a bit holder, a quick change adapter or an extension adapted to be arranged between such a socket and a tool or a bit holder, is needless to say adapted to provide a secure engagement between a socket and a nut or screw and a power tool (or in the case of an adapter between such a socket and the tool) such that torque may be transferred and the screw or nut tightened. To ensure the secure engagement, the first and second engaging structure may have any suitable design, such as hex, square or similar. For example, in one embodiment, the open cavity referenced above may be formed by a square cross sectional recess intended for receiving the square shaped end portion of a power tool output shaft and the device may comprise an internal cross sectional shape adapted to fit the type of screw joint to be tightened, for instance a hexagonal shape, at its front end.

The power tool with which the inventive device may be used may be a tightening tool such as a screwdriver, such as a pneumatic or electrically powered screwdriver. The device may be particularly advantageous for use in an automatic tightening operation involving a robot or similar, or may be used with a hand held tool, possibly a battery powered tool, or a handheld manual tool such as a torque wrench.

According to one embodiment the pin comprises a body portion and a head portion, wherein the head portion is adapted to, in use, extend into the corresponding hole in the power tool output. The head portion may in some embodiments have a shape adapted to the shape of the hole in the power tool output shaft. I.e., the pin may be described as arranged to extend at least partly through the open cavity to, in use, extend into a hole formed in the output shaft—for example in the center of the output shaft in turn implying that the pin may be arranged to extend in the center of the cavity.

According to one embodiment the pin extends along a center axis A-A of the torque transferring device and the hole in the power tool output is a center hole.

A center hole in the context of the present specification is the center hole which is commonly used to support for example long shafts, in this case, the power tool output shaft, for machining during manufacturing. Such machining may include machining by means of a lathe or similar comprising a so called tail stock having a cone shaped end which engages the center hole to locate the center of the part accurately and hence allow the part being machined to rotate about its center accurately. Such center holes are hence provided to be used for the machining process, but are in this case utilized by the inventive socket according to this embodiment to provide the guide functionality also during tightening.

It follows, that according to one embodiment the head portion is conical. This in order to fit the conical shape of such a center hole and to provide the accurate rotation.

In one embodiment, the length of the head portion is longer or equal to the depth of the hole provided in the output shaft. In one exemplary embodiment, the cone shaped head is arranged to in use make contact with the tool output before the output shaft reaches the bottom of the open cavity.

According to one embodiment the total length of the pin lies in the range 0.5-15 mm.

According to one embodiment the open cavity comprises a wall, wherein a hole is provided in the wall opening into the open cavity, and wherein the body portion of the pin is arranged in the hole. In one embodiment, the wall is a delimiting wall forming a bottom of said open cavity. Further, the hole may be a blind hole opening into said open cavity, the body portion being arranged in or within the blind hole.

According to one embodiment the torque transferring device further comprises at least one magnet for biasing the pin against a ferromagnetic output shaft by means of a magnetic force. The skilled person realizes that any number of magnets is conceivable. In one embodiment, four magnets are equidistantly arranged.

According to one embodiment the at least one magnet is arranged in a hole provided in the delimiting wall and opening into the open cavity. The depth of the hole may correspond substantially to the length of the magnet—i.e., the at least one magnet may be arranged flush with the wall surface.

According to one embodiment, a surface of the delimiting wall facing the open cavity is substantially flat and extends in a direction perpendicular to the center axis A-A.

According to one embodiment the device further comprises a freely rotatable outer sleeve provided on the outside of the device for operator protecting purposes. Hereby, the operator may be protected from injuries due to for instance tangled gloves. According to one embodiment, the freely rotatable sleeve further comprises a radially protruding collar arranged at an end of the sleeve adjacent to the second engaging structure to prevent the hand of the operator from slipping towards the joint. The freely rotatable sleeve may in some embodiments be a shorter sleeve provided at either of the first and second end of the device whereas in other embodiments a longer sleeve covering the entirety of the length of the device may be provided. According to one embodiment the outer sleeve is made of an electrically insulating material. Hereby, additional protection is provided in the form of radial insulation.

According to one embodiment the device further comprises an inner insulating element, wherein the inner insulating element is rotatably coupled to the first engaging structure and to the second engaging structure such that a torque may be transferred there between, and wherein the inner insulating element is made of an electrically insulating material, such that an electrical insulation is formed between the first engaging structure and the second engaging structure for operator protecting purposes. The insulating material from which the inner insulating component and/or the insulating outer sleeve is made may be a polymer, for example a thermoplastic polymer where examples include POM, or in some cases a thermosetting polymer such as epoxy, possibly reinforced (e.g. glass reinforced).

According to one embodiment the torque transferring device is a component chosen from the group socket, bit holder, quick change adapter and extension. According to one embodiment the device is a socket or a bit holder, and wherein the engaging portion arranged at a front end thereof adapted to engage a corresponding mating structure to transfer torque thereto, is a portion adapted to engage a nut or a bit. According to one embodiment the device is a quick change adapter or an extension, wherein the engaging portion arranged at a front end thereof adapted to engage a corresponding mating structure to transfer torque thereto is an adapter or extension output adapted to engage a bit, socket or bit holder. An extension is as device or unit adapted to be arranged between a power tool and a socket, which enables a user to for example reach screws difficult to access with standard sockets. A quick change adapter is as device or unit adapted to be arranged between a power tool and a socket, which enables a quick change of sockets.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

Figure 1A:
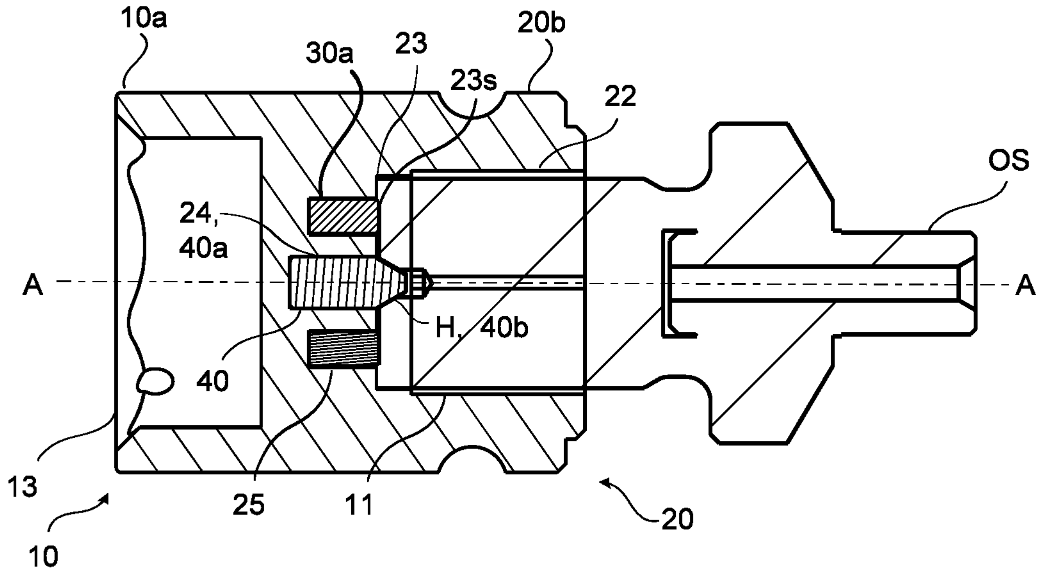
FIG. 1*a* is a cross sectional view of an exemplary torque transferring device according to a first embodiment.

All figures are schematic, not necessarily to scale and generally only show parts which are necessary in order to elucidate the invention, wherein other parts may be omitted or merely suggested.

DETAILED DESCRIPTION

An exemplary torque transferring device 1 for use with a power tool according to a first embodiment is shown arranged on a power tool output shaft OS in a cross sectional view in FIG. 1. The illustrated exemplary device 1 is a socket 1 comprising a first portion 10 and a second portion 20. A first engaging structure 13 is arranged at a front end 10*a* of the first portion 10 and adapted to engage a nut to transfer torque thereto, i.e. to tighten a joint. The second portion 20 similarly comprises a second engaging structure 22 arranged at a rear end 20*b* of the socket and comprising— or formed by—an open cavity 11 adapted to receive the output shaft OS of the power tool—in the illustrated embodiment a square female output OS.

In order to improve the engagement and guiding, the socket further comprises a pin 40 extending through this open cavity 11 in an axial direction A-A. The pin 40 is arranged to in use, as shown in FIG. 1, engage the hole H formed in the power tool output shaft OS. The hole H in the illustrated output shaft OS is a cone shaped center hole—i.e. a hole provided in the output shaft in order to facilitate machining of the shaft during manufacturing by means of engaging a correspondingly cone shaped bar for example during lathing. The pin of the embodiment illustrated in FIG. 1 comprises a body portion 40*a* and a conical head portion 40*b*, where the head portion is adapted to, in use as shown in FIG. 1, extend into the correspondingly conical hole H.

The body portion 40*a* of the pin is arranged in a blind hole 24 provided in a delimiting wall 23 forming a bottom of the open cavity 22—the wall 23 is substantially flat and extends in a direction perpendicular to the center axis A-A. It follows that the head portion 40*a* only is arranged in the open cavity.

The length of the head portion is adapted in order to ensure that the head portion 40*a* makes contact with the cone shaped surface of the hole H of the output shaft before the flat portion F of the tool square OS comes into contact with the wall 23.

In order to provide an even further engagement, the illustrated embodiment further comprises magnets 30*a*; 30*b* arranged in blind holes provided in the delimiting wall 23 opening into the cavity 22 for attracting the commonly ferromagnetic output shaft OS by means of a magnetic force against the pin 40.

Figure 1B:
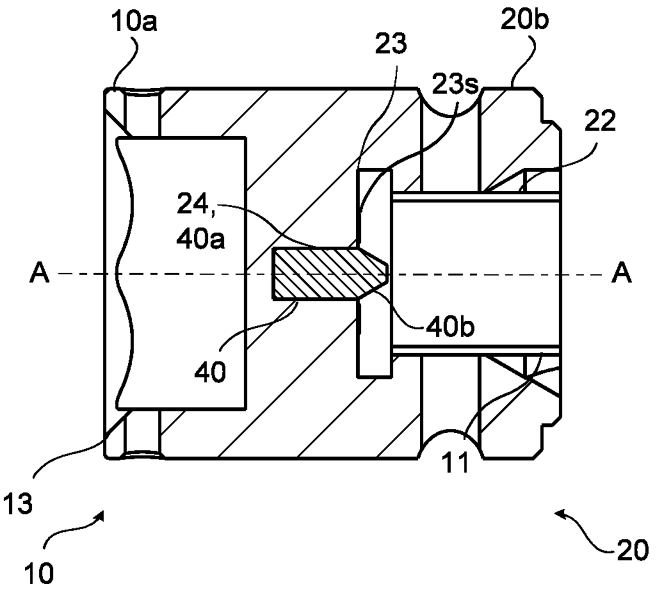
FIG. 1*b* is a cross sectional view of an exemplary torque transferring device according to a first embodiment.

Turning to FIG. 1*b*, a similar socket is shown in a cross sectional view. As the socket of FIG. 1, the socket 1 of FIG. 1*b* comprises a first engaging structure 13 adapted to engage a nut to transfer torque thereto and a second engaging structure 22 formed by an open cavity 11 adapted to receive the output shaft OS of the power tool (not shown). The socket further comprises a pin 40 extending through this open cavity and arranged to in use, as shown in FIG. 1, engage the hole H formed in the power tool output shaft OS. The pin comprising a body portion 40*a* and a conical head portion 40*b*, where the head portion is adapted to, in use extend into the hole H. The illustrated embodiment however differs from the embodiment of FIG. 1*a* in that no magnets are provided.

Figure 2:
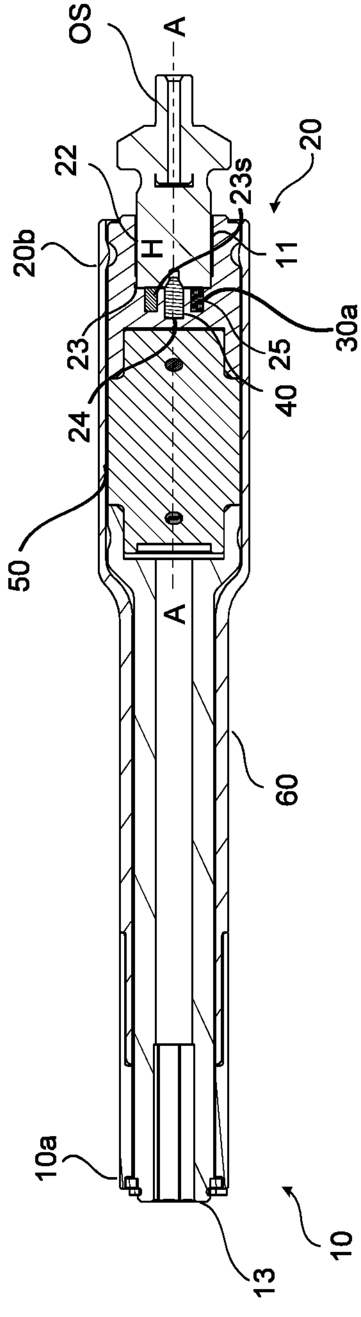
FIG. 2 is a cross sectional view of an exemplary torque transferring device according to a second embodiment.

Turning to FIG. 2, another exemplary torque transferring device 1 according to a third embodiment is shown in a cross sectional view arrange don a tool output shaft. The illustrated exemplary device 1 is however an extension 1. Similarly to the embodiments in FIGS. 1*a* and *b*, the extension comprises a first portion 10 and a second portion 20. A first engaging structure 13 is arranged at a front end 10*a* of the first portion 10 and adapted to engage a socket to tighten a joint. The second portion 20 comprises a second engaging structure 22 arranged at a rear end 20*b* of the extension and comprising—or formed by—an open cavity 11 adapted to receive the output shaft OS of the power tool.

Also as described above, the extension of FIG. 2 comprises a pin 40 extending through the open cavity 11 in an axial direction A-A.

The pin 40 comprises a cylindrical body portion arranged in a blind hole 24 provided in the wall 23 and a conical head portion, where the head portion is adapted to, in use, extend into a correspondingly conical hole H in the output shaft OS.

However, in the third embodiment, for operator protecting purposes, an electrical insulation is formed between the first engaging structure 13 and the second engaging structure 22, and hence between the joint and the tool and the hand of the operator holding the tool. This by means of an inner insulating element 50, made of an electrically insulating material arranged between and rotatably coupled to the first engaging structure and the second engaging structure such that a torque may be transferred there between.

In order to further enhance the operator protection, the extension of the illustrated embodiment in FIG. 2 includes a freely rotatable outer sleeve 60 made of an electrically insulating material and provided on the outside of the extension. It should be noted that the additional protective features shown in FIG. 2—i.e. the insulating sleeve and element, may just as well be applied to the sockets shown in FIGS. 1*a* and *b*.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims. For example, the invention may apart from the sockets and extension adapter of the illustrated embodiments just as well be realized as a (quick change) adapter, or as a bit holder.

Additionally, variations to the disclosed embodiments can be understood and effected by those skilled in the art in practicing the claimed invention, from a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A torque transferring device for a power tool, comprising a first portion comprising a first engaging structure arranged at a front end of said first portion and adapted to engage a corresponding mating structure to transfer torque thereto, and a second portion comprising a second engaging structure for connection to an output shaft of a power tool arranged at a rear end portion of said second portion, wherein said second portion comprises an open cavity adapted to receive said output shaft of a power tool, said device further comprising a pin arranged at least partly in said open cavity, wherein said pin is arranged to extend in an axial direction and further arranged to, in use, engage a hole formed in said power tool output shaft, wherein said pin comprises a body portion and a head portion, wherein said head portion is adapted to, in use, extend into said hole formed in said power tool output shaft.

2. Torque transferring device according to claim 1, wherein said pin extends along a center axis A-A of said torque transferring device and wherein said hole in said power tool output is a center hole.

3. Torque transferring device according to claim 1, wherein said head portion is conical.

4. Torque transferring device according to claim 1, wherein a total length of said pin lies in a range 0.5-15 mm.

5. Torque transferring device according to claim 1, wherein said open cavity comprises a delimiting wall, wherein a hole is provided in said wall opening into said open cavity, and wherein said body portion of said pin is arranged in said hole.

6. Torque transferring device according to claim 5, wherein a surface of said delimiting wall facing said open cavity is substantially flat and extends in a direction perpendicular to a center axis A-A of said torque transferring device.

7. Torque transferring device according to claim 1, further comprising at least one magnet for biasing said pin against a ferromagnetic output shaft by means of a magnetic force.

8. Torque transferring device according to claim 7, wherein said at least one magnet is arranged in a hole provided in said delimiting wall and opening into said open cavity.

9. Torque transferring device according to claim 1, wherein the device further comprises a freely rotatable outer sleeve for operator protecting purposes.

10. Torque transferring device according to claim 9, wherein said freely rotatable outer sleeve is made of an electrically insulating material.

11. Torque transferring device according to claim 1, further comprising an inner insulating element, wherein said inner insulating element is rotatably coupled to said first engaging structure and to said second engaging structure such that a torque may be transferred there between, and wherein said inner insulating element is made of an electrically insulating material, such that an electrical insulation is formed between said first engaging structure and said second engaging structure for operator protecting purposes.

12. Torque transferring device according to claim 1, wherein said torque transferring device is a component chosen from the group socket, bit holder, quick change adapter and extension.

13. Torque transferring device according to claim 12, wherein said device is a socket or a bit holder, and wherein said first portion arranged at a front end thereof adapted to engage a corresponding mating structure to transfer torque thereto, is a portion adapted to engage a nut or a bit.

14. Torque transferring device according to claim 12, wherein said device is a quick change adapter or an extension, and wherein said first portion arranged at a front end thereof adapted to engage a corresponding mating structure to transfer torque thereto, is an adapter or extension output adapted to engage a bit, socket or bit holder.

* * * * *